C. MORGAN.
BELT-COUPLING.
No. 176,031.                                   Patented April 11, 1876.
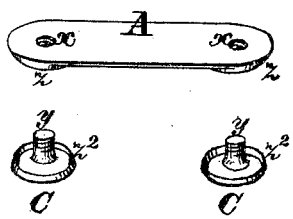
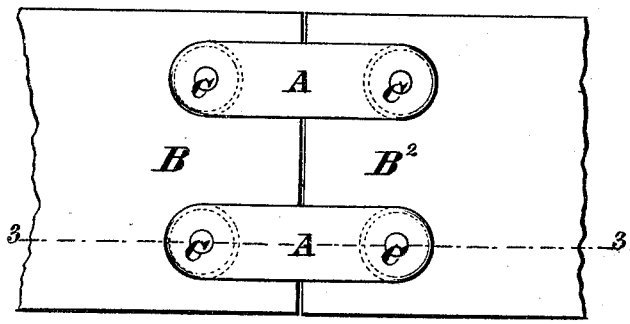
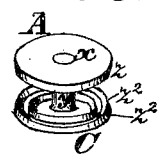
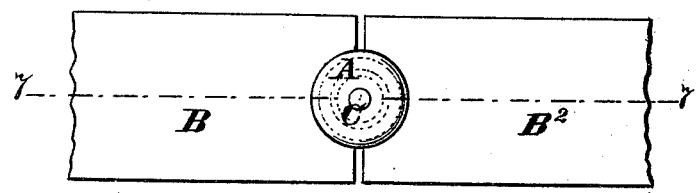
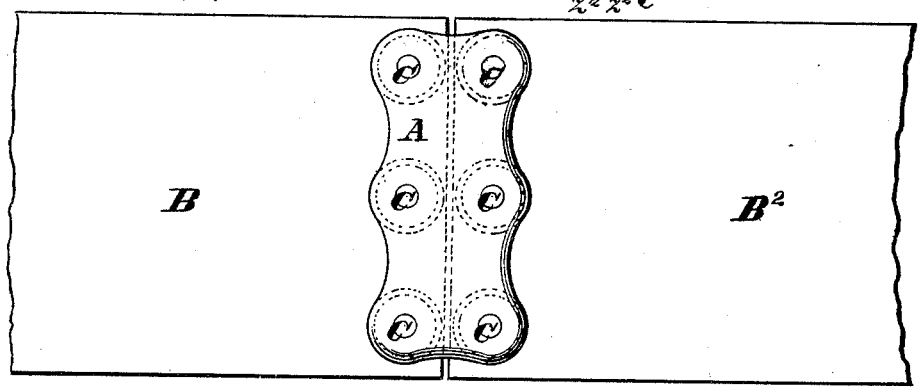
WITNESSES
Henry Tanner
W. H. Pearce
INVENTOR
Charles Morgan
By Knight-Pero Attorneys.

UNITED STATES PATENT OFFICE.

CHARLES MORGAN, OF BRIDGEPORT, CONNECTICUT, ASSIGNOR TO HIMSELF, PHILO PIERCE, AND DANIEL FERRIS, OF SAME PLACE.

IMPROVEMENT IN BELT-COUPLINGS.

Specification forming part of Letters Patent No. 176,031, dated April 11, 1876; application filed March 27, 1876.

*To all whom it may concern:*

Be it known that I, CHARLES MORGAN, of the town of Bridgeport and county of Fairfield, in the State of Connecticut, have invented a certain new and useful Improvement in Belt-Couplings, of which the following is a specification:

This invention relates to metallic couplings or fastenings for flat belts, driving-bands, or straps of leather or other flexible material.

The invention consists in the employment or use of a single or compound nut for the back of the belt, and one or more screws with broad heads to engage with the inner surface of the belt, the inner faces of the nut and screw-heads having inwardly-projecting flanges concentric with the screws proper, and adapted to embed themselves in the material of the belt without wearing the same, in order to hold the ends of the belt together, so as to relieve the perforations through which the screws pass from strain, or without reliance thereon; also, to cause the screw-heads to embed themselves in the inner surface of the belt, so as to obviate wear of pulleys and slippage.

Figure 1 is a perspective view of the parts of a preferred form of this coupling. Fig. 2 is a plan view of a belt coupled by means of the same. Fig. 3 is a longitudinal section on the line 3 3, Fig. 2. Fig. 4 is a longitudinal section, illustrating the substitution of a hinged compound nut for the coupling-spring. Fig. 5 is a perspective view of a single coupling, illustrating the employment of duplicated holding-flanges on the respective parts. Fig. 6 is a plan view of the coupling shown in Fig. 5 as applied to a belt. Fig. 7 is a longitudinal section on the line 7 7, Fig. 6. Fig. 8 is a plan view, illustrating the employment of a large compound coupling.

This metallic coupling is intended, primarily, for flat belts or driving-bands for all kinds of machinery, but is applicable also to harness and other straps.

The coupling consists, essentially, of a single or compound nut, A, for application to the back of the belt ends B B$^2$, and one or more screws, C, with broad heads, to engage with or be embedded in the inner surface of the belt, each of the parts being, by the first part of the invention, constructed with one or more inwardly-projecting flanges, $z$ $z^2$, concentric with the screws proper, $y$ $x$, as illustrated in all the figures of the drawing. In a preferred form the nut A is compound, having orifices $x$ at each end, and it is flexible, continuous, and elastic, so as to be termed a "coupling-spring." This form of the coupling is illustrated in Figs. 1, 2, and 3.

Two or more couplings may be applied to each joint of a belt, as illustrated in Fig. 2, or a single coupling may be employed where one is sufficient. The number will be determined by the width of the belt.

The employment of a hinged compound nut instead of a coupling-spring is illustrated in Fig. 4. The hinge-joint $w$ is of common form, and is made to project wholly on the inside, so as to occupy a recess formed in the abutting ends of the belt. The employment of a single nut and screw is illustrated in Figs. 5, 6, and 7. In this form the screw-stem $y$ passes between the abutting ends of the belt, or through an orifice formed by notches therein, and no perforation of the belt is required. The employment of a rigid compound nut with six screws is illustrated in Fig. 8. This form of coupling may be employed to advantage in wide belts running on large pulleys.

In its preferred form the improved coupling is adapted to conform to any size of pulley or spindle, and by modification, as illustrated, it may be adapted for a great variety of uses. The absence of any extended metallic surface on the inside of the belt is a great advantage, as the presence of such surface tends to wear the pulleys and to cause slippage, while the hammering action incident thereto produces a great strain on the parts of the coupling. The concentric holding-flanges $z$ $z^2$ of this coupling, penetrating or embedding themselves in the material of the belt, cause the heads of the screws to sink flush with the surface, so as not to come in contact with the pulleys, and there is consequently no more wear or slippage than if metallic couplings were not employed. The concentric flanges serve also, and primarily, to remove all strain from the holes in the belts through which the screws pass, and, by forming an extended holding-surface, they render the coupling exceedingly strong and reliable.

A single pair of flanges concentric to each screw has been found to be entirely sufficient for ordinary purposes; but the employment of two or more flanges on the respective parts around each screw has been contemplated, and is illustrated in Figs. 5, 6, and 7.

By obviating any reliance on the holes in the belt for the security of the coupling, the latter in a simple form is adapted to be employed without perforating the ends of the belt, as hereinbefore referred to, and illustrated in Figs. 5, 6, and 7.

The screw-heads are, by preference, made smaller than the flanges on the coupling-nuts, so that the bends of the belt shall not result in any cutting which might otherwise occur. The bending of the belt, owing to the said construction, relieves it partially from the outer flanges, which engage again therewith immediately upon that portion of the belt in which the coupling is situated becoming straight, or approximately so.

The following is claimed as new in this invention, namely:

A coupling-plate, A, having one or more screw-holes, $x$, and holding-flanges $z$, concentric therewith, in combination with screws C, having broad heads and concentric holding and embedding flanges thereon, to engage with the inner surface of the belt, as and for the purpose herein specified.

CHARLES MORGAN.

Witnesses:
DAVID B. BOODE,
DAVID B. LOCKWOOD.